United States Patent
Liao et al.

(10) Patent No.: US 12,552,705 B2
(45) Date of Patent: Feb. 17, 2026

(54) GLASS FIBER AND METHOD FOR PRODUCING THE SAME

(71) Applicant: NAN YA PLASTICS CORPORATION, Taipei (TW)

(72) Inventors: Te-Chao Liao, Taipei (TW); Wei-Sheng Cheng, Taipei (TW); Chia-Shan Chang, Taipei (TW); Chung-Ni Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 142 days.

(21) Appl. No.: 18/611,663

(22) Filed: Mar. 20, 2024

(65) Prior Publication Data
US 2025/0214884 A1    Jul. 3, 2025

(30) Foreign Application Priority Data
Dec. 27, 2023    (TW) ................... 112150898

(51) Int. Cl.
*C03C 14/00* (2006.01)
*C03B 37/02* (2006.01)
(Continued)

(52) U.S. Cl.
CPC ............ *C03C 14/004* (2013.01); *C03B 37/02* (2013.01); *C03C 3/091* (2013.01); *C03C 13/00* (2013.01);
(Continued)

(58) Field of Classification Search
None
See application file for complete search history.

(56) References Cited

U.S. PATENT DOCUMENTS

2013/0017749 A1 *  1/2013  Choudhary ............. C03B 37/04
                                                              65/483
2019/0118164 A1 *  4/2019  Alshafei ................... C07C 6/04
                          (Continued)

FOREIGN PATENT DOCUMENTS

EP          4299541 A1    1/2024
JP       2013500937 A     1/2013
                   (Continued)

OTHER PUBLICATIONS

Ander Diego-Lopez, Oscar Cabezuelo, Alejandro Vidal-Moya, M. Luisa Marin, Francisco Bosca, "Synthesis and mechanistic insights of SiO2@WO3@Fe3O4 as a Novel Supported Photocatalyst for Wastewater Remediation under Visible Light", Applied Materials Today, Jul. 7, 2023, pp. 1-11, vol. 33 (2023) 101879, Published by Elsevier Ltd.

*Primary Examiner* — Queenie S Dehghan
(74) *Attorney, Agent, or Firm* — Li & Cai Intellectual Property Office

(57) ABSTRACT

A glass fiber and method for producing the same are provided. The method includes a covering process, a sintering process, a mixing process, and drawing process. The covering process is implemented by covering a tungsten compound onto a plurality of surfaces of a plurality of inorganic particles to form a plurality of modified inorganic particles. The sintering process is implemented by sintering the modified inorganic particles in a nitrogen atmosphere having a temperature of between 400° C. and 1,000° C. The mixing process is implemented by mixing the modified inorganic particles into a glass raw material that is in a molten state. The drawing process is implemented by drawing the glass raw material mixed with the modified inorganic particles to form a plurality of glass fibers.

9 Claims, 3 Drawing Sheets

(51) Int. Cl.
  *C03C 3/091* (2006.01)
  *C03C 13/00* (2006.01)
(52) U.S. Cl.
  CPC ...... *C03C 2213/00* (2013.01); *C03C 2214/05* (2013.01); *C03C 2214/30* (2013.01)

(56) References Cited

U.S. PATENT DOCUMENTS

| | | | |
|---|---|---|---|
| 2020/0139324 A1* | 5/2020 | Ostraat | ............ B01J 2/18 |
| 2023/0061070 A1* | 3/2023 | Hansen | ............ C03C 13/06 |
| 2023/0373845 A1 | 11/2023 | Hosokawa et al. | |

FOREIGN PATENT DOCUMENTS

| | | | |
|---|---|---|---|
| JP | 2021500226 A | 1/2021 | |
| TW | 201823026 A | 7/2018 | |
| TW | 202244022 A | 11/2022 | |
| TW | 202335989 A | 9/2023 | |
| WO | WO2023276619 A1 | 1/2023 | |

\* cited by examiner

GLASS FIBER AND METHOD FOR PRODUCING THE SAME

CROSS-REFERENCE TO RELATED PATENT APPLICATION

This application claims the benefit of priority to Taiwan Patent Application No. 112150898, filed on Dec. 27, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a glass fiber and a method for producing the same, and more particularly to a glass fiber including tungsten compound and a method for producing the same.

BACKGROUND OF THE DISCLOSURE

In a conventional method for producing glass fibers, since a sliding property of the glass fibers is not good enough, the glass fibers can easily break during a drawing process.

SUMMARY OF THE DISCLOSURE

In response to the above-referenced technical inadequacy, the present disclosure provides a glass fiber and a method for producing the same to effectively improve on problems of a conventional glass fiber easily breaking during a drawing process.

In order to solve the above-mentioned problems, one of the technical aspects adopted by the present disclosure is to provide a method for producing glass fibers. The method includes a covering process, a sintering process, a mixing process and a drawing process. The covering process is implemented by covering a tungsten compound onto a plurality of surfaces of a plurality of inorganic particles to form a plurality of modified inorganic particles. Based on a total weight of each of the inorganic particles being 100 wt %, a content of the tungsten compound is 0.01 wt % to 5 wt %. The sintering process is implemented by sintering the modified inorganic particles in a nitrogen atmosphere having a temperature of between 400° C. and 1,000° C. The mixing process is implemented by mixing the modified inorganic particles in a glass raw material that is in a molten state. The drawing process is implemented by drawing the glass raw material mixed with the modified inorganic particles to form a plurality of glass fibers.

In one of the possible or preferred embodiments, the tungsten compound is at least one selected from the group consisting of tungsten hexachloride and ammonium metatungstate.

In one of the possible or preferred embodiments, each of the inorganic particles is at least one selected from the group consisting of silicon dioxide, titanium dioxide, aluminum hydroxide, magnesium hydroxide, calcium carbonate, aluminum oxide, and calcined kaolin.

In one of the possible or preferred embodiments, a particle size of each of the inorganic particles is within a range from 0.01 micrometers to 50 micrometers.

In one of the possible or preferred embodiments, based on a total weight of each of the glass fibers being 100 wt %, a content of the modified inorganic particles is 0.1 wt % to 5 wt %.

In one of the possible or preferred embodiments, in the covering process, the tungsten compound is dissolved in a solvent to form a solution, the solution is filled into a sprayer, the solution is sprayed onto the inorganic particles through the sprayer, the solution and the inorganic particles are stirred, and the solution is dried, such that the tungsten compound covers the inorganic particles.

In one of the possible or preferred embodiments, a nozzle diameter of the sprayer is less than 0.2 micrometers.

In one of the possible or preferred embodiments, based on a total weight of the glass raw material, the glass raw material includes 54 wt % to 63 wt % of silicon dioxide, 15 wt % to 24 wt % of aluminum oxide, 6 wt % to 13 wt % of magnesium oxide, 3.4 wt % to 14 wt % of calcium oxide, 0.5 wt % to 9 wt % boron trioxide, and 0 wt % to 7 wt % rhenium trioxide. Based on a total weight of each of the glass fibers being 100 wt %, a content of the modified inorganic particles is 0.1 wt % to 5 wt %, and a content of the glass raw material is 95 wt % to 99.9 wt %.

In one of the possible or preferred embodiments, each of the glass fibers has a maximum static friction coefficient within a range from 0.34 to 0.54.

Therefore, in the glass fiber and the method for producing the same provided by the present disclosure, by virtue of "the covering process, the sintering process, the mixing process, and the drawing process" and "based on the total weight of each of the inorganic particles being 100 wt %, the content of the tungsten compound being 0.01 wt % to 5 wt %," the conventional glass fiber that easily breaks during the drawing process can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
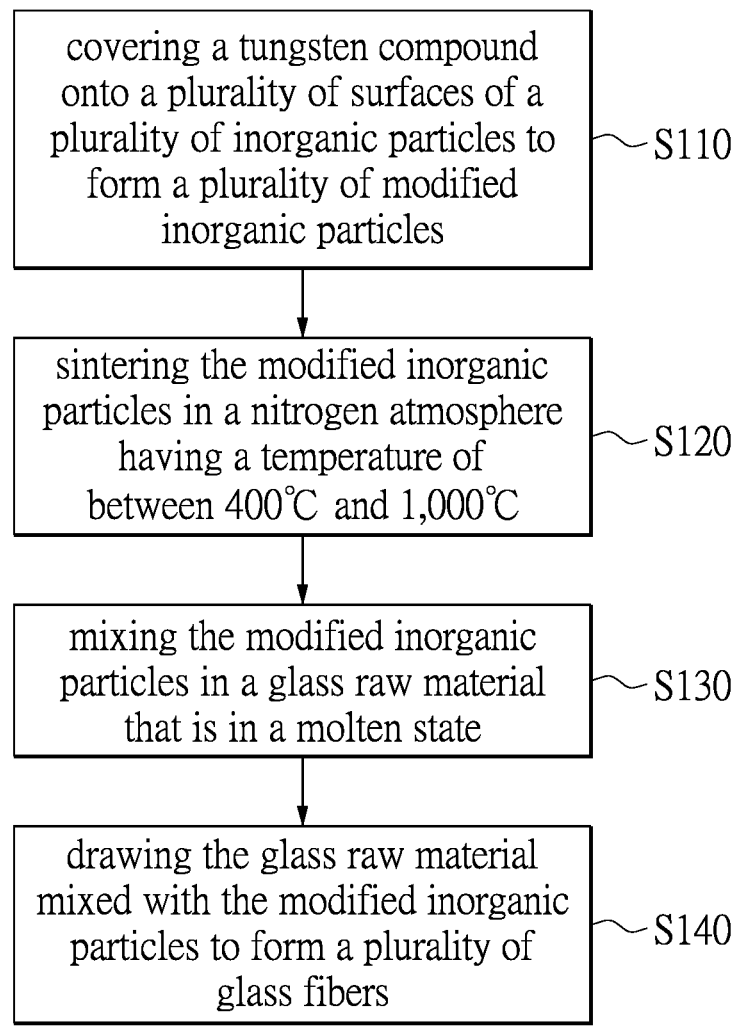
FIG. 1 is a flowchart of a method for producing glass fibers according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Producing Glass Fibers]

Figure 2:
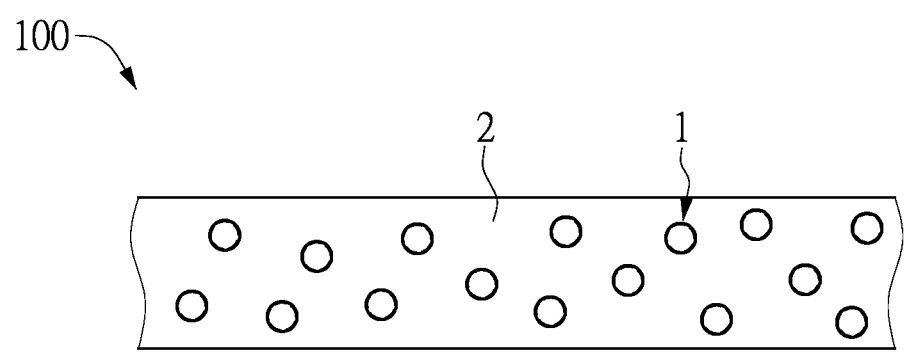
FIG. 2 is a schematic view of a glass fiber according to the embodiment of the present disclosure.
Figure 3:
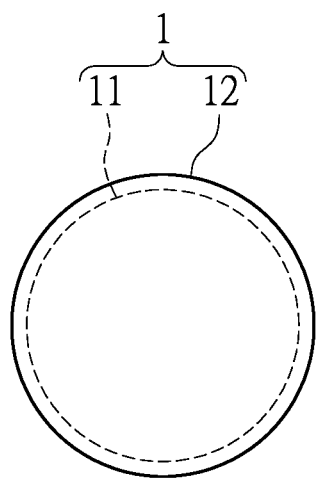
FIG. 3 is a schematic view of a modified inorganic particle according to the embodiment of the present disclosure.

Referring to FIG. 1 to FIG. 3, FIG. 1 is a flowchart of a method for producing glass fibers according to an embodiment of the present disclosure, FIG. 2 is a schematic view of a glass fiber according to the embodiment of the present disclosure, and FIG. 3 is a schematic view of a modified inorganic particle according to the embodiment of the present disclosure. An embodiment of the present disclosure provides a method for producing glass fibers, and the method includes a covering process S110, a sintering process S120, a mixing process S130, and a drawing process S140.

In the covering process S110, a tungsten compound covers onto a plurality of surfaces of a plurality of inorganic particles to form a plurality of modified inorganic particles 1. Each of the modified inorganic particles 1 includes a core-shell structure, the core-shell structure includes a core layer 11 formed by the inorganic particle and a shell layer 12 formed by the tungsten compound. Based on a total weight of each of the modified inorganic particles 1 being 100 wt %, a content of the tungsten compound is 0.01 wt % to 5 wt %, and a content of the inorganic particles is 95 wt % to 99.9 wt %. A particle size of each of the modified inorganic particles 1 is within a range from 0.01 micrometers to 50 micrometers. Preferably, the particles size of each of the modified inorganic particles 1 is within a range from 0.1 micrometers to 30 micrometers.

The tungsten compound is at least one selected from the group consisting of tungsten hexachloride and ammonium metatungstate. The tungsten element has a crystal structure of body-centered cubic (e.g., B.C.C.), thereby having a high melting point and high density property.

It is worth mentioning that, the inorganic particles need to have a heat resisting property, so as to prevent from melting or cracking in the sintering process S120. Preferably, each of the inorganic particles is at least one selected from the group consisting of silicon dioxide, titanium dioxide, aluminum hydroxide, magnesium hydroxide, calcium carbonate, aluminum oxide, and calcined kaolin.

In the covering process S110 of one embodiment, the tungsten compound is dissolved in a solvent to form a solution, the solution is filled into a sprayer, the solution is sprayed onto the inorganic particles through the sprayer, the solution and the inorganic particles are stirred, and the solution is dried, such that the tungsten compound covers the inorganic particles. The solvent can be, for example, water, ethanol, or isopropyl alcohol. Preferably, a nozzle diameter of the sprayer is less than 0.2 micrometers.

In the sintering process S120, the modified inorganic particles are sintered in a nitrogen atmosphere having a temperature of between 400° C. and 1,000° C. The nitrogen atmosphere refers to a pure nitrogen environment, if the sintering process S120 is not implemented in the nitrogen atmosphere, oxygen in the environment may cause the tungsten compound to oxidize, thereby affecting a maximum static friction coefficient of a glass fiber 100.

In addition, through the sintering process S120, the modified inorganic particles 1 undergo lattice rearrangement, such that tungsten ions are inserted into the crystal lattice of the inorganic particles. In this way, tungsten ions do not not easily fall off from the surfaces of the inorganic particles, and the property of the fiber glass 100 is not easily affected.

In the mixing process S130, the modified inorganic particles 1 are mixed into a glass raw material 2 that is in a molten state. Based on a total weight of the glass raw material 2, the glass raw material 2 can include 54 wt % to 63 wt % of silicon dioxide, 15 wt % to 24 wt % of aluminum oxide, 6 wt % to 13 wt % of magnesium oxide, 3.4 wt % to 14 wt % of calcium oxide, 0.5 wt % to 9 wt % boron trioxide, and 0 wt % to 7 wt % rhenium trioxide, but the present disclosure does not limit the components included by the glass raw material 2 and the content of each component.

In the drawing process S140, the glass raw material 2 mixed with the modified inorganic particles 1 is drawn to form a plurality of glass fibers 100. Based on a content of each of the glass fibers 100 being 100 wt %, a content of the modified inorganic particles 1 is 0.1 wt % to 5 wt %, and a content of the glass raw material 2 is 95 wt % to 99.9 wt %.

It is worth mentioning that, after the drawing process S140, the glass fibers 100 already have an excellent sliding property, and after the drawing process S140, the glass fibers 100 are not required to be added with any lubricant at the surfaces thereof. In addition, in the present disclosure, the modified inorganic particles 1 are evenly dispersed in the glass fibers 100 and are not only located at the surfaces of the glass fibers 100, such that the glass fibers 100 do not easily break during the drawing process S140.

In other words, other methods for producing glass fibers in which lubricant is added after drawing process and a glass fiber that has lubricant only located at the surface thereof are not suitable to be compared to the method and the glass fiber 100 of the present disclosure. In addition, if the lubricant is only added at the surfaces of the glass fibers, the glass fibers easily break during the drawing process since an internal sliding property of the glass fibers is not enhanced.

In addition, if the tungsten compound is directly added into the glass raw material 2, the tungsten compound cannot evenly disperse in the glass fibers 100. Accordingly, in the method of the present disclosure, the tungsten compound covers onto the surfaces of the inorganic particles to form the modified inorganic particles 1, and then the modified inorganic particles 1 are dispersed in the glass raw material 2, such that the modified inorganic particles 1 can be evenly dispersed in the glass fibers 100.

The glass fiber 100 has a maximum static friction coefficient within a range from 0.34 to 0.54.

[Method for Producing Glass Fibers]

The present disclosure further provides a glass fiber 100, the glass fiber 100 can be produced by implementing the above-mentioned method, but the present disclosure is not limited thereto. The glass fiber 100 includes a glass raw material 2 and a plurality of modified inorganic particles 1 dispersed in the glass raw material 2.

Each of the modified inorganic particles 1 includes an inorganic particle and a tungsten compound covering the inorganic particle. Each of the modified inorganic particles 1 has a core-shell structure, the core-shell structure includes a core layer 11 formed by the inorganic particle and a shell layer 12 formed by the tungsten compound. The tungsten compound is at least one selected from the group consisting of tungsten hexachloride and ammonium metatungstate, and each of the inorganic particles is at least one selected from the group consisting of silicon dioxide, titanium dioxide, aluminum hydroxide, magnesium hydroxide, calcium carbonate, aluminum oxide, and calcined kaolin.

A particle size of each of the modified inorganic particles 1 is within a range from 0.01 micrometers to 50 micrometers. Based on a total weight of each of the glass fibers 100 being 100 wt %, a content of the modified inorganic particles 1 is 0.1 wt % to 5 wt %, and a content of the glass raw material 2 is 95 wt % to 99.9 wt %.

The glass fiber 100 has a maximum static friction coefficient within a range from 0.34 to 0.54. Preferably, maximum static friction coefficient of the glass fiber 100 is within a range from 0.34 to 0.47.

Experimental Results

Hereinafter, a more detailed description will be provided with reference to Exemplary Examples 1 to 3 and Comparative Example 1. However, the following Exemplary Examples are only used to aid in understanding of the present disclosure, and are not to be construed as limiting the scope of the present disclosure.

In Comparative Example 1, no modified inorganic particle is added. In the method of Exemplary Example 1 to 3, based on the total weight of the glass fiber being 100 wt %, the contents of the modified inorganic particles are 0.02 wt %, 0.2 wt %, and 2 wt %, respectively.

For the glass fiber produced by the method of each of Exemplary Examples 1 to 3 and Comparative Example 1, the maximum static friction coefficient, the wear resistance, and the heat stability are listed in Table 1 below. The relevant test methods are also described as follows.

A maximum static friction coefficient test is carried out by taking two test pieces each having a thickness of 5 mm and made of the glass fibers, and testing the maximum static friction coefficient of the test pieces with a friction coefficient tester (model CFT-400) under a loading condition of 200 g.

A wear resistance test is carried out by contacting a sample made of the glass fibers with a grinding wheel of a grinder and observing and grading the wear resistance of the sample.

A heat stability test is carried out by analyzing a thermal expansion coefficient of the sample made of the glass fibers with a thermal mechanical analyzer (model TMA 400 of TMA Company).

A high strength glass fiber modulus test is carried out by placing a 3-centimeter-long sample in a resonance frequency and damping signal measuring instrument, knocking the sample to generate a resonance signal, and receiving the resonance signal through a microphone and analyzing the resonance signal through a resonance frequency analyzing software to obtain a modulus value.

TABLE 1

[Maximum Static Friction Coefficient and Other Properties of Glass Fibers of Exemplary Examples 1 to 3 and Comparative Example 1]

| Item | Comparative Example 1 | Exemplary Example 1 | Exemplary Example 2 | Exemplary Example 3 |
|---|---|---|---|---|
| Content of modified inorganic particles (wt %) | 0 | 0.02 | 0.2 | 2 |
| Maximum static friction coefficient of glass fibers | 0.54 | 0.47 | 0.4 | 0.34 |
| Wear resistance of glass fibers | 1,000 | 1,080 | 1,140 | 1,460 |
| Thermal expansion coefficient $(10^{-6}/)^\circ$ C. | 4 | 3.4 | 3 | 2.4 |
| High strength glass fiber modulus (Gpa) | 80 | 82 | 87 | 91 |

Discussion of Test Results

As shown in Exemplary Examples 1 to 3, by adding 0.02 wt % to 2 wt % of the inorganic particles, the glass fiber can have a maximum static friction coefficient within a range from 0.34 to 0.54, a wear resistance within a range from 1,080 to 1,460, a thermal expansion coefficient within a range from $2.4 \times 10^{-6}/^\circ$ C. to $3.4 \times 10^{-6}/^\circ$ C., and a high strength glass fiber modulus within a range from 82 Gpa to 91 Gpa, and the glass fiber can meet a requirement of the high strength glass fiber modulus being greater than 87 Gpa.

Beneficial Effects of the Embodiment

In conclusion, in the glass fiber and the method for producing the same provided by the present disclosure, by virtue of "the covering process, the sintering process, the mixing process, and the drawing process" and "based on the total weight of each of the inorganic particles being 100 wt %, the content of the tungsten compound being 0.01 wt % to 5 wt %," the conventional glass fiber that easily breaks during the drawing process can be effectively improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A method for producing glass fibers, comprising:
   a covering process implemented by covering a tungsten compound onto a plurality of surfaces of a plurality of inorganic particles to form a plurality of modified inorganic particles, wherein, based on a total weight of each of the inorganic particles being 100 wt %, a content of the tungsten compound is 0.01 wt % to 5 wt %;

a sintering process implemented by sintering the modified inorganic particles in a nitrogen atmosphere having a temperature of between 400° C. and 1,000° C.;

a mixing process implemented by mixing the modified inorganic particles in a glass raw material that is in a molten state; and a drawing process implemented by drawing the glass raw material mixed with the modified inorganic particles to form a plurality of glass fibers.

2. The method according to claim 1, wherein the tungsten compound is selected from the group consisting of tungsten hexachloride and ammonium metatungstate.

3. The method according to claim 1, wherein each of the inorganic particles is selected from the group consisting of silicon dioxide, titanium dioxide, aluminum hydroxide, magnesium hydroxide, calcium carbonate, aluminum oxide, and calcined kaolin.

4. The method according to claim 1, wherein a particle size of each of the inorganic particles is within a range from 0.01 micrometers to 50 micrometers.

5. The method according to claim 1, wherein, based on a total weight of each of the glass fibers being 100 wt %, a content of the modified inorganic particles is 0.1 wt % to 5 wt %.

6. The method according to claim 1, wherein, in the covering process, the tungsten compound is dissolved in a solvent to form a solution, the solution is filled into a sprayer, the solution is sprayed onto the inorganic particles through the sprayer, the solution and the inorganic particles are stirred, and the solution is dried, such that the tungsten compound covers the inorganic particles.

7. The method according to claim 6, wherein a nozzle diameter of the sprayer is less than 0.2 micrometers.

8. The method according to claim 1, wherein, based on a total weight of the glass raw material, the glass raw material includes 54 wt % to 63 wt % of silicon dioxide, 15 wt % to 24 wt % of aluminum oxide, 6 wt % to 13 wt % of magnesium oxide, 3.4 wt % to 14 wt % of calcium oxide, 0.5 wt % to 9 wt % boron trioxide, and 0 wt % to 7 wt % rhenium trioxide, wherein, based on a total weight of each of the glass fibers being 100 wt %, a content of the modified inorganic particles is 0.1 wt % to 5 wt %, and a content of the glass raw material is 95 wt % to 99.9 wt %.

9. The method according to claim 1, wherein each of the glass fibers has a maximum static friction coefficient within a range from 0.34 to 0.54.

\* \* \* \* \*